(12) United States Patent
Aharoni et al.

(10) Patent No.: US 7,756,882 B2
(45) Date of Patent: Jul. 13, 2010

(54) METHOD AND APPARATUS FOR ELEGANT MAPPING BETWEEN DATA MODELS

(75) Inventors: Avner Y. Aharoni, Seattle, WA (US); David N. Schach, Redmond, WA (US); Erik Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 10/957,516

(22) Filed: Oct. 1, 2004

(65) Prior Publication Data

US 2006/0101423 A1    May 11, 2006

(51) Int. Cl.
G06F 17/30 (2006.01)
G06F 17/00 (2006.01)

(52) U.S. Cl. .................. 707/756; 709/246
(58) Field of Classification Search ............. 709/246; 707/1, 101
See application file for complete search history.

(56) References Cited

U.S. PATENT DOCUMENTS

| | | | | |
|---|---|---|---|---|
| 5,315,709 A | * | 5/1994 | Alston et al. | 707/6 |
| 6,636,845 B2 | | 10/2003 | Chau et al. | 707/1 |
| 6,643,633 B2 | | 11/2003 | Chau et al. | 707/1 |
| 6,775,822 B1 | | 8/2004 | Apte et al. | 717/120 |
| 6,785,673 B1 | | 8/2004 | Fernandez et al. | 707/3 |
| 6,789,252 B1 | | 9/2004 | Burke et al. | 717/100 |
| 6,820,135 B1 | * | 11/2004 | Dingman et al. | 709/246 |
| 7,152,070 B1 | * | 12/2006 | Musick et al. | 707/101 |
| 2004/0015928 A1 | * | 1/2004 | Seelemann | 717/156 |
| 2006/0004854 A1 | * | 1/2006 | Okunseinde et al. | 707/103 Y |

OTHER PUBLICATIONS

Bossung, Sebastian et al., "Automated Data Mapping Specification via Schema Heuristics and User Interaction," 2004, Procedings of the 19th International Conference on Automated Software Engineering, IEEE, pp. 1-10.*

Alimarine et al., "A Generic Programming Extension for Clean," 2001, IFL, LNCS 2312, pp. 168-185.*

Dobre et al., Operators and Classification for Data Mapping in Semantic Integration, Oct. 2003, Springer Berlin/ Heidelberg, Conceptual Modeling, pp. 534-547.*

Foster, J. N. et al., "Combinators for Bi-Directional Tree Transformations: A Linguistic Approach to the View Update Problem", Technical Report MS-CIS-04-15, *Department of Computer and Information Science, University of Pennsylvania*, Aug. 7, 2004, 1-75.

(Continued)

*Primary Examiner*—James Trujillo
*Assistant Examiner*—Dawaune Conyers
(74) *Attorney, Agent, or Firm*—Woodcock Washburn LLP (57) ABSTRACT

Data is requested by an XML application conforming to the XML data model. The data is stored in an SQL database conforming to the relational data model. A mapping component transforms the XML query into an SQL query using a mapping component comprising instructions obtained from an instruction set defined by a mapping algebra. The transformed operation is used to retrieve the data. Once retrieved, the algebraically defined mapping component transforms the SQL data from data conforming to the relational data model to data conforming to the XML data for use in the XML application.

42 Claims, 8 Drawing Sheets

OTHER PUBLICATIONS

Foster, J.N et al., "Combinators for Bi-Directional Tree Transformations: A Linguistic Approach to the View Update Problem", *University of Pennsylvania*, Aug. 28, 2004, 1-23.

Greenwald, M.B. et al., "A Language for Bi-Directional Tree Transformations", Technical Report MS-CIS-03-08, *Department of Computer and Information Science, University of Pennsylvania*, Aug. 5, 2003, Revised May 15, 2004, 1-42.

Pierce, B.C. et al., "Bringing Harmony to Optimism, An Experiment in Synchronizing Heterogeneous Tree-Structured Data", Technical Report MS-CIS-03-42, *Department of Computer and Information Science, University of Pennsylvania*, Mar. 18, 2004, 1-27.

Pierce, B.C. et al., "Lenses and View Update Translation", *University of Pennsylvania*, Working draft of Apr. 3, 2003, 1-7.

* cited by examiner

"People.Rename(ID,PersonID).Up(Address,PersonID).Target(Person)"

METHOD AND APPARATUS FOR ELEGANT MAPPING BETWEEN DATA MODELS

CROSS REFERENCE TO RELATED APPLICATIONS

This application is related by subject matter to the invention disclosed in commonly assigned U.S. patent application Ser. No. 10/652,214 filed on Aug. 29, 2003, entitled "MAPPING ARCHITECTURE FOR ARBITRARY DATA MODELS."

FIELD OF THE INVENTION

The present invention relates generally to the field of mapping between data models, and more particularly to an elegant method and apparatus for mapping between data models using an algebraic instruction set ensuring that the mapping performed has optimal characteristics.

BACKGROUND OF THE INVENTION

In recent decades, since the use of computers has become prevalent, the number and type of useful computer applications is expanding, as is their complexity. Furthermore, the world is increasingly populated with information sources where in many cases the data is represented differently from source to source. Thus, increasingly, applications involve using more than one data model. For example, an application might read and manipulate data from one source, in which data is stored in object form, and another source, in which data is stored in relational database form. As another example, a web-based XML application may sometimes be required to utilize data of another type, such as relational database data. In one common scenario, for example, an XML application generates and manipulates XML documents that appear to the user to exist in files or as network packets, when in fact, they are being created on demand through translation from relational database representations.

For these applications, it is necessary to develop some method or apparatus whereby fundamental operations, such as operations that accomplish the reading and writing of data, in one data model, are translated into accurate corresponding operations in another data model, and vice versa. It is similarly necessary to be able to accurately convert a structural representation of one data model to a corresponding equivalent structural representation in another data model.

To solve these problems, methods of mapping between data models have been developed. However, the task of transforming between data models is still very costly and often inefficient as witnessed by the endless list of products that provide some form of mapping between data models. Attempted solutions to the problem of data model mapping have included approaches that add extensions to query languages (e.g., in the "FOR XML" and "OPEN XML") products, approaches that explicitly generate code conforming to one or another data model, and declarative mapping approaches. However, in general, these products tend to be specific to particular data models and of limited applicability.

Thus, a generally applicable, unified and declarative mapping approach allowing mapping between any two data models was developed and disclosed in commonly assigned U.S. patent application Ser. No. 10/652,214 filed on Aug. 29, 2003, entitled "MAPPING ARCHITECTURE FOR ARBITRARY DATA MODELS," the contents of which is hereby incorporated by reference. That application specifies the syntax of an innovative declarative mapping approach.

But in order for a declarative mapping approach to be not only generally applicable, but also generally accepted, and optimally useful, it would be advantageous if it ensured that the mapping performed using the approach was always both bi-directional and composable. There is therefore a need for a generally applicable, unified, data model mapping approach that is both bi-directional and composable.

SUMMARY OF THE INVENTION

The present invention satisfies this need.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

One embodiment of the present invention comprises a computing device with a processor that executes a software receiving element comprising instructions that receive or accept data conforming to a first data model. The computing device also executes a software transformation element comprising instructions causing transformation of operations or data conforming to the first data model into other operations or data conforming to a second data model. The software transformation element instructions are obtained from a set of programming language instructions that are semantically defined by a mapping algebra that mathematically ensures that the transformation conforms to at least one mapping property, such bidirectional mapping or compositional mapping.

Another embodiment of the present invention resides in a method for transforming data including receiving data or operations conforming to a first data model and transforming the data conforming to the first data model into other data or operations conforming to a second data model using executable instructions obtained from a set of programming language instructions. These programming language instructions are semantically defined by a mapping algebra, with the mapping algebra mathematically ensuring that the transformation conforms to at least one mapping property, such as bidirectional mapping or compositional mapping.

Yet another embodiment of the present invention comprises a computer-readable medium having instructions for performing steps that include the transforming of received data or operations conforming to a first data model into other data or operations conforming to a second data model, with the instructions being obtained from a set of programming language instructions. These programming language instructions are semantically defined by a mapping algebra, with the mapping algebra mathematically ensuring that the transforming of the received data conforms to at least one mapping property, such as bidirectional or compositional mapping.

One advantage of embodiments of the present invention is their general applicability and ability to map between any two data models. Embodiments of the present invention may be used to transform data conforming to an XML data model to data conforming to a relational data model, or from data conforming to an object data model to data conforming to a relational data model. Because of the general applicability of the mapping algebra of the present invention, embodiments of the present invention may also implement products such as "ObjectSpaces," "MBF," "WinFS," "SQLXML," "FORXML," "Hibernate," "TopLink" and International Business Machine Corp.'s "SDO's" (service data objects).

Furthermore, executable instructions designed in accordance with embodiments of the present invention provide the benefits traditionally associated with modular programming. Mapping routines that work across data model can be re-used, are easier to understand and need only be changed once to effect global changes in an application. Furthermore, mapping routines can be constructed from other mapping routines without losing critical mathematical properties.

Another advantage of embodiments of the present invention is that they provide a way of guaranteeing that data model mapping is both compositional and bidirectional.

Other advantages of embodiments of the present invention improve the compilation efficiency of programming languages by providing a formal, recognizable and complete algebraic description of optimized mapping operations implemented in such programming languages.

Further advantages of the present invention should become apparent from the detailed description below.

DETAILED DESCRIPTION OF ILLUSTRATIVE EMBODIMENTS

Definitions

As used herein, the term "data" is meant in its broadest possible sense, and includes both "data" commands that specify executable operations, data resulting from such operations as well as the underlying metadata that defines the structure, and relationship and/or fields of a data model.

Overview the Transformation Problem

Figure 1:
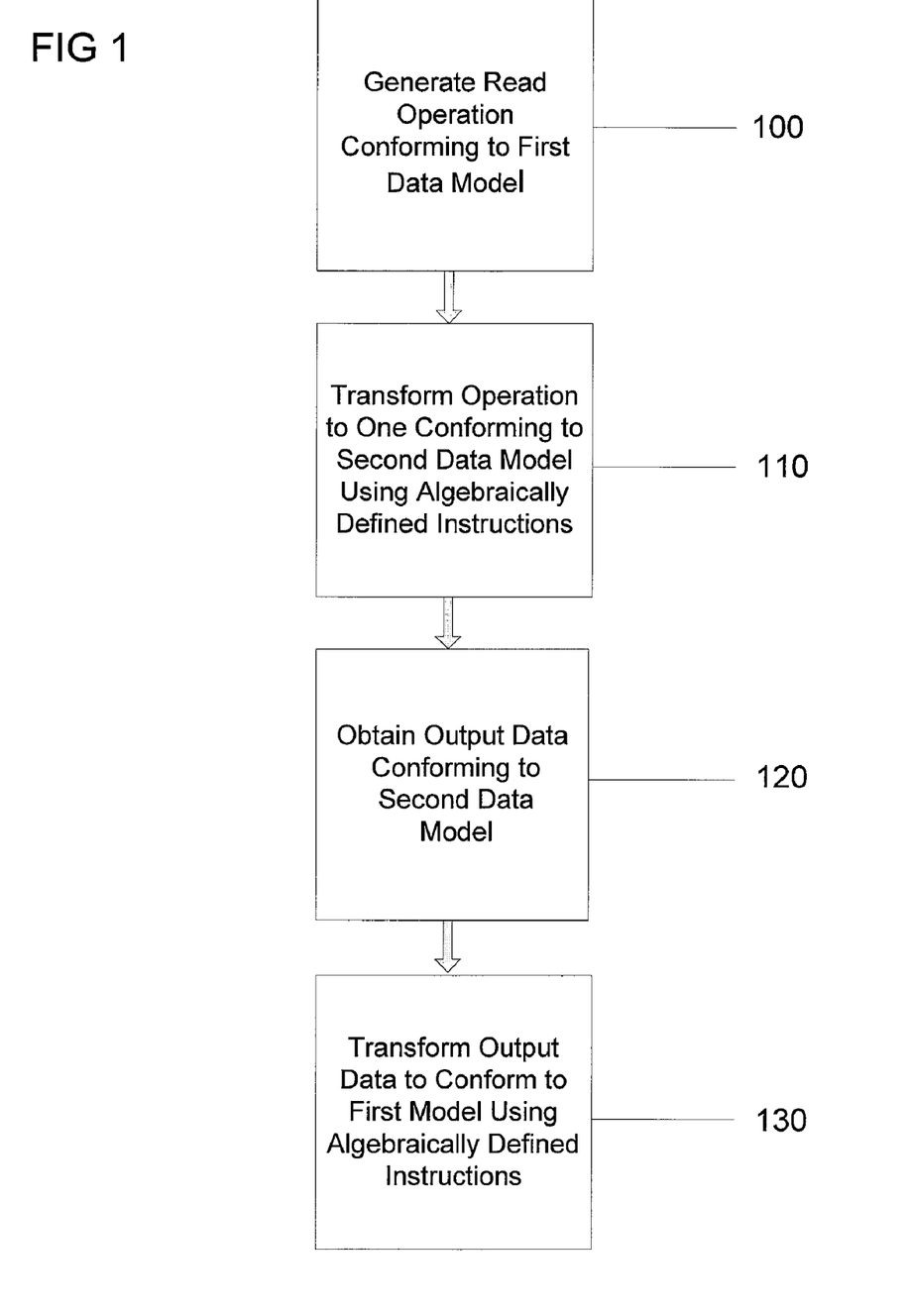
FIG. 1 is a block diagram illustrating a method for transforming data in accordance with an embodiment of the present invention.

Turning now to FIG. 1, it shows a high level description of a computer-executable method for transforming data in accordance with an embodiment of the present invention. FIG. 1 is intended to be a simple, high level example and is provided for illustration purposes. The mapping algebra of embodiments of the present invention may be used to implement transformations that are far more complex than that disclosed in FIG. 1.

In a common scenario, an application may be executing operations conforming to a first data model. For example, an XML application may be executing XML operations. In Step 100, a "query" operation is encountered, for example an "XQuery" operation, signaling a request for the retrieval of data. It is not uncommon for this data to conform to some relational (e.g. SQL) or other data model other than XML. Thus in step 110, the data is transformed or "mapped" so that "XQuery" operation becomes a relational data operation. Mapping techniques for accomplishing such transformations are known. However, in accordance with the present invention, a series of executable instructions accomplishes this transformation, where the instruction are obtained from a set of programming language instructions semantically defined by a mapping algebra. The mapping algebra guarantees that the transformation adheres to certain mathematical properties. Specific embodiments of such an algebra are described more fully below.

Once the mapping operation is complete, in Step 120 the XQuery operation is replaced with an SQL or other relational data operation allowing retrieval of data conforming to the relation data model (e.g., tabular data). Once the data is retrieved, in Step 130, the retrieved data is again transformed, this time from a data conforming to a relational data base model to data conforming to the XML model. In this way, the data can be used by the XML applications. Furthermore, in accordance with embodiments of the present invention, the transformation again is executed using instructions derived from an algebraically defined operation set.

Figure 2:
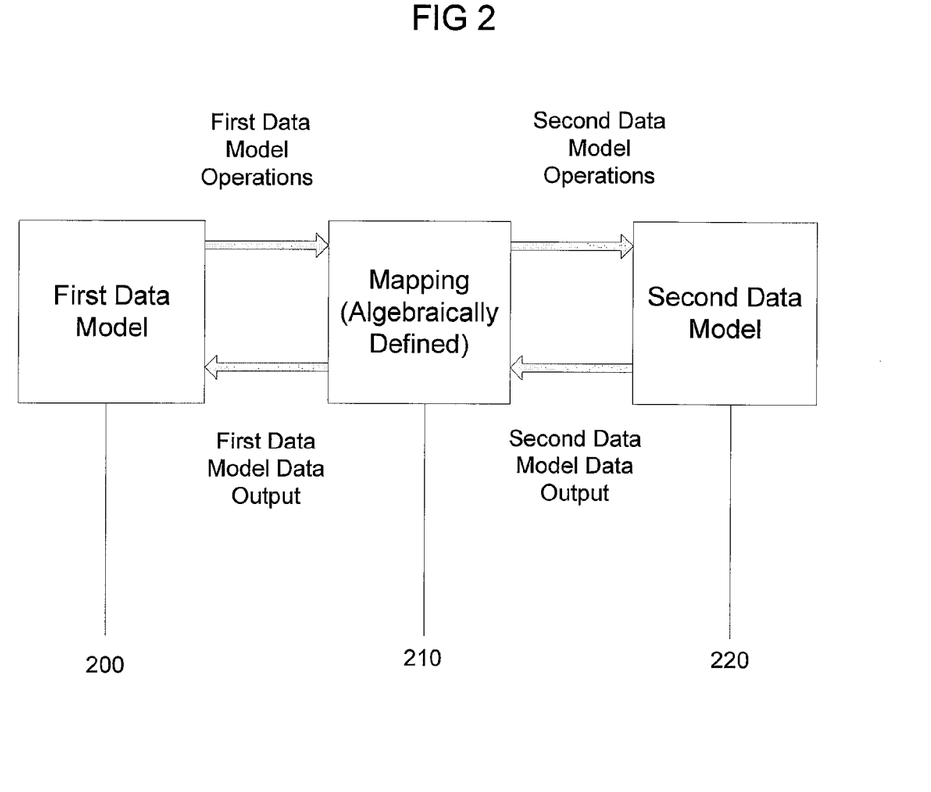
FIG. 2 is a block diagram illustrating an implementation of the method of FIG. 1 in which the algebraic mapping step is implemented in a middleware component layered between an application using a first data model and an application using a second data model.

Turning now to FIG. 2, it pictorially illustrates an implementation of the method of FIG. 1, again chosen for its simplicity. FIG. 2 discloses one of many implementations of the present invention. In FIG. 2, an application conforming to a first data model 200 is layered on an application conforming to a second data model 220. Block 210 illustrates a "middleware" or "mapping" component layered in between the applications that can be used to implement mapping operations. In accordance with a middleware implementation of the present invention, the middleware component 210 operates through executable instructions derived from an algebraically defined program set. Embodiments of the algebraically defined program set are described in greater detail below.

As shown in FIG. 2, the application conforming to the first data model 200 generates operations such as "XQuery" operations. The mapping component 210 translates the "XQuery" operations into corresponding operations conforming to the second data model (e.g., SQL). Data conforming to the second model is then retrieved. Once retrieved, the mapping component 210 translates the data into data conforming to the first data model so that it can be used and processed by application conforming to the first data model 200.

Mode and Operation of a Mapping Algebra

A Unified Mapping System Environment

Preferably, the mapping algebra of embodiments of the present invention is used to semantically define the intruction set of an otherwise unified, generally applicable mapping system. A unified three part declarative system of mapping operations, and their syntax, is disclosed U.S. patent application Ser. No. 10/652,214.1 filed on Aug. 29, 2003, entitled "MAPPING ARCHITECTURE FOR ARBITRARY DATA MODELS" incorporated herein by reference. The system will not be described in great detail here.

However, broadly, in the disclosed system, the mapping between the data models is described using a declarative three part mapping schema that provides the information about the correspondence of the structures, fields and relationships between the data models.

Figure 3:
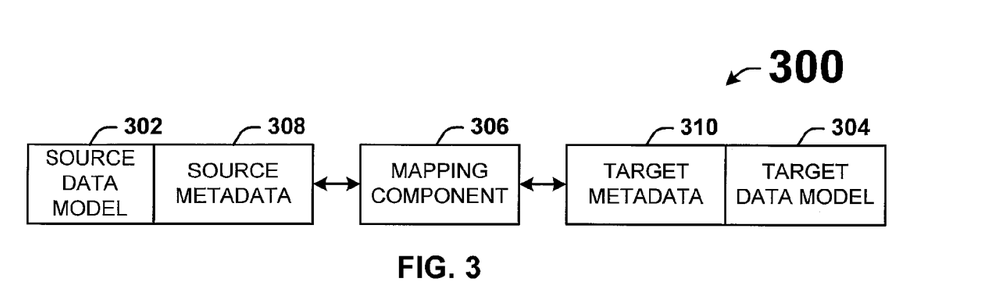
FIG. 3 is a block diagram illustrating a declarative mapping system which may implement the present invention.

FIG. 3 illustrates a block diagram showing an overview of a three part declaratory mapping system to show an exemplary mapping operation environment in which embodiments of the present invention may be implemented. The three part declaratory framework provides the capability of the data models to perform CRUD (Create, Read, Update, and Delete) operations in their domain using their respective query languages, APIs (Application Programmable Interfaces) or other software, which are transformed to operations. For example, XML and object data models may perform CRUD operations in their domain using their query languages (e.g., XQuery and OPath, respectively), which are transformed to operations in the relational domain using its query language (e.g., SQL).

The system 300 specifies a source data model 302 and a target data model 304, where mapping occurs from the source data model 302 to the target data model 304 via a mapping component 306. Each data model (302 and 304) has associated therewith metadata characteristics that exposes one or more entities that can be related. That is, the source data model 302 exposes source metadata characteristics 308 and the target data model 304 exposes target metadata 310 characteristics which metadata (308 and 310) each comprise conceptual entities that are directly relatable via the mapping component 306. The metadata characteristics include the concepts (or expressions) of structure, field, and relationship.

The system semantically differentiates the target and source. Thus some domains are classified as the sources 302 and others are classified as the targets 304. The target data model 304 holds the view of the source data model 302. The mapping is materialized using the query language of the target domain. The source data model 302 is the persistent location of the data, and the mapping component translates the query written in the target domain query language to the source domain query language. Thus, this three-part architecture allows one to generalize and unify the semantics of the mapping information in terms of the set of operations that are performed for any given mapping.

Figure 4:
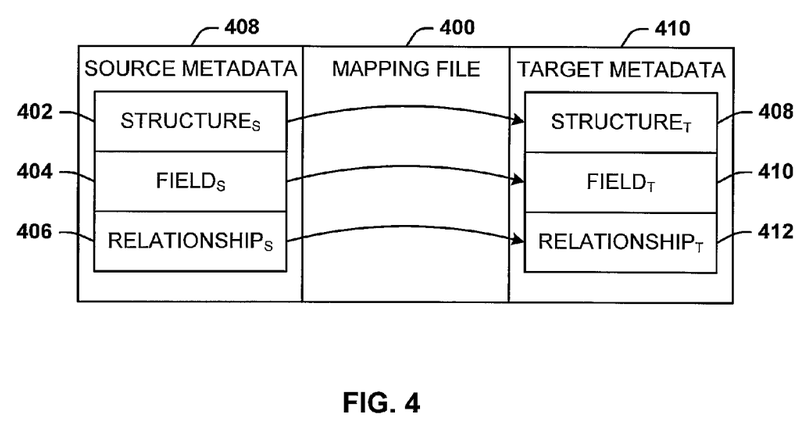
FIG. 4 is block diagram illustrating a mapping of metadata characteristics by the declarative mapping system illustrated in FIG. 3.

Turning now to FIG. 4, there is illustrated a diagram of the metadata characteristics specified by a unified mapping system to facilitate mapping of the source to the target. The unified mapping system posits that a mapping file 400 aligns the mapping function between the source metadata 408 and the target metadata 410. In this particular embodiment, the source metadata 408 and target metadata 410 each comprise three characteristics that may be used to establish a mapping relationship: structure, field, and relationship. Thus the mapping system posits that the source metadata 408 includes a STRUCTURES entity 402, a FIELDS entity 404, and a RELATIONSHIPS entity 406. Similarly, the target metadata 410 includes a corresponding STRUCTURET entity 408, a FIELDT entity 410, and a RELATIONSHIPT entity 412.

The structure is the base component of the data model schema, and serves as a container for related mapping fields. Examples include a table in a relational domain, a complex type element in the XML domain, and a class in an object domain. A field entity is a data model concept that holds typed data. Conceptually, the field holds scalar values, although in some cases, the field can hold complex data (such as XML data type and UDT).

Examples for mapping fields include columns in a relational data model, attributes and simple type elements in an XML domain, and properties in an object domain. The relationship is the link and association between two structures in the same data model, and describes how structures in the same domain relate to each other. The relationship is established through either common fields in the two structures, and/or containment/reference where a structure contains another structure, e.g., XML containment hierarchy, and an object that references another object through its field.

A Mapping Design Pattern Example Using the Unified System

An example illustrating the unified mapping system is now provided using an inheritance hierarchy of pets and a person that owns pets. The following is a block of source code that defines a class "Person" in ObjectSpaces, one of the many programming languages that conform to the object data model paradigm:

```
public class Person {
    public int PersonID;
    public string Name;
    public Length Height = new Length( );
    public string Street;
    public string City;
    public string State;
    public int Zip;
    public List<Pet> Pets = new List<Pet>( );
}
public class Length {
    public int Feet;
    public int Inch;
}
public class Pet {
    public int PetID;
    public string Name;
}
public class Dog : Pet { public bool IsBabySafe; }
public class Cat : Pet{ public int LivesLeft; }
```

Note that in accordance with well known principles of such object-oriented definitions, the "Dog" and "Cat" classes inherit the "PetId" and "Name" fields of the defined "Pet" Class.

In an embodiment of the present invention, program instructions used to accomplish mapping functions include those in a mapping file containing references to the relational and object or XML schemas. In this embodiment, these schemas provide the metadata about the mapped objects and tables including the idenity columns/properties and the applicable relationships:

```
<MappingSchema xmlns="http://schemas.microsoft.com/mapping/2003/06/msd">
  <DataSources>
    <DataSource Name="Pets" Default="Pets.dbo">
      <Schema Location="Pets.rsd.xml"/>
    </DataSource>
    <DataTarget Type="Object">
      <Schema Location="Pets.osd.xml"/>
    </DataTarget>
  </DataSources>
  <Mappings>
    ...
  </Mappings>
</MappingSchema>
```

Note that the "rsd" and "osd" extensions refer to relational and object schema definitions, respectively.

The most trivial pattern maps a single class to a single table and each field to a column. Mapping provides the ability to rename both the table name and the column names. In the example below the "Dogs" table is mapped to the "Dog" class and the "ID" column to the "PetID" field. The "Name" and "IsBabySafe" columns are not renamed. The "Dogs" table is shown below.

| Dogs |
|---|
| ID |
| Name |
| IsBabySafe |

In this embodiment, the Map element provides the existence semantics. It specifies that for every row instance in the table there exists an object instance in the application and for every object instance in the application there exists a row in the corresponding table.

The FieldMap element provides the copy semantics. It specifies the column to copy from/to the object field:

```
<Map Source="Dogs" Target="Dog">
  <FieldMap SourceField="ID" TargetField="PetID"/>
  <FieldMap SourceField="Name" TargetField="Name"/>
  <FieldMap SourceField="IsBabySafe" TargetField="IsBabySafe"/>
</Map>
```

Figure 5:
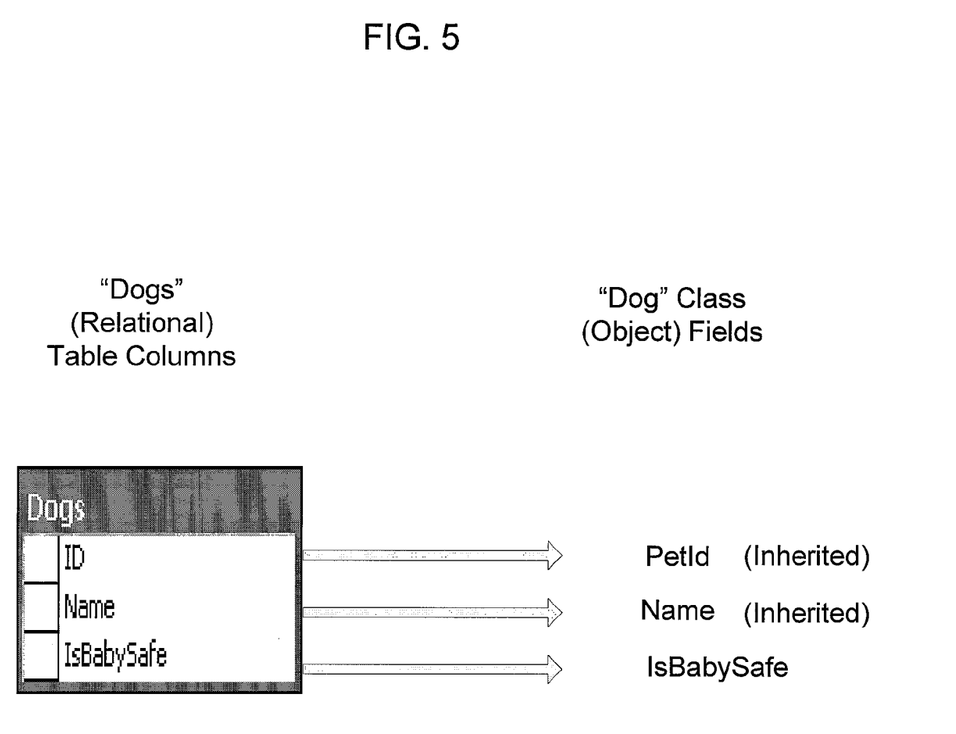
FIG. 5 visually depicts an example in which data conforming to a relational data model is mapped to data conforming to an object data model using the declarative mapping system illustrated in FIG. 3.

This mapping operation is illustrated in FIG. 5.

Exemplary Algebraic Expressions

In accordance with an embodiment of the present invention, a mapping algebra semantically defines the instructions in the mapping file. The following table describes the operators of an exemplary mapping algebra and explains the design pattern they address. The term "source" designates a type in one domain. These operators are applied to the source type and results in a definition of a target type:

| Operator | Operation explained |
|---|---|
| Source(A) | Ensures the source type is A |
| Target(B) | Rename the source type to the target type |
| Rename(n → m) | Renaming a field n to a field m |
| Extend(B b, R) | Creates an edge to type B through field b using relationship R |
| Plus(A, B, R) | Combines two types into a single type using relationship R to relate the instances. R must be 1 to 1. |
| Keep(n, m, . . . ) | Keep fields n, m etc and drop everything else. |
| Drop(n, m, . . . ) | Do not include the fields n, m etc. |
| Up(B b) | Lift the fields from type B (field b) on the Source into fields on the target type |
| Down(n, m → b) | Create a field b with an anonymous type whose members include n, m etc. which are moved from the source type. |
| ApplyMap(b, M) | Apply map M to field b |
| Ensure(n == x) | Ensures instance has the field n equal the value x |
| Coerce(T n → S n) | Change the type (T) of property n to a new type (S) |
| Concurrency(n, m, . . . ) | Use fields n and m for concurrency |
| Key(n, m, . . . ) | Use fields n and m for identifying the instance identity |

Mapping Design Pattern Example Using a Mapping Algebra

In accordance with an embodiment of the present invention, an exemplary mapping operation is now illustrated to show the use of an exemplary mapping algebra that semantically defines the mapping operations of the mapping file.

In some instances, a single object instance is stored in multiple tables, and, therefore, the columns from multiple tables may need to be mapped to the fields of a single class. Continuing with the "Person" class example, taken from object oriented environment, that class has "PersonID," "Name," "Street," "City," "State" and "Zip" fields. At the same time, the database has separate tables "People" and "Address" that have one-to-one relationship. That one-to-one relationship is illustrated in tabular form below.

The SubMap element adds an additional table specified by the Source and SourceRelationship attributes to the Person Map. This allows mapping columns from the "Address" table to fields of the target class ("Person") of the container map:

```
<Map Source="People" Target="Person">
  <FieldMap SourceField="ID" TargetField="PersonID"/>
  <FieldMap SourceField="Name" TargetField="Name"/>
  <SubMap Source="Address"
  SourceRelationship="FK_Address_People">
    <FieldMap SourceField="Street" TargetField="Street"/>
    <FieldMap SourceField="City" TargetField="City"/>
    <FieldMap SourceField="State" TargetField="State"/>
    <FieldMap SourceField="Zip" TargetField="Zip"/>
  </SubMap>
</Map>
```

The mapping expressed using the exemplary algebra will be as follows:

"People.Rename(ID, PersonID).Up(Address,PersonID).Target (Person)."

Figure 6:
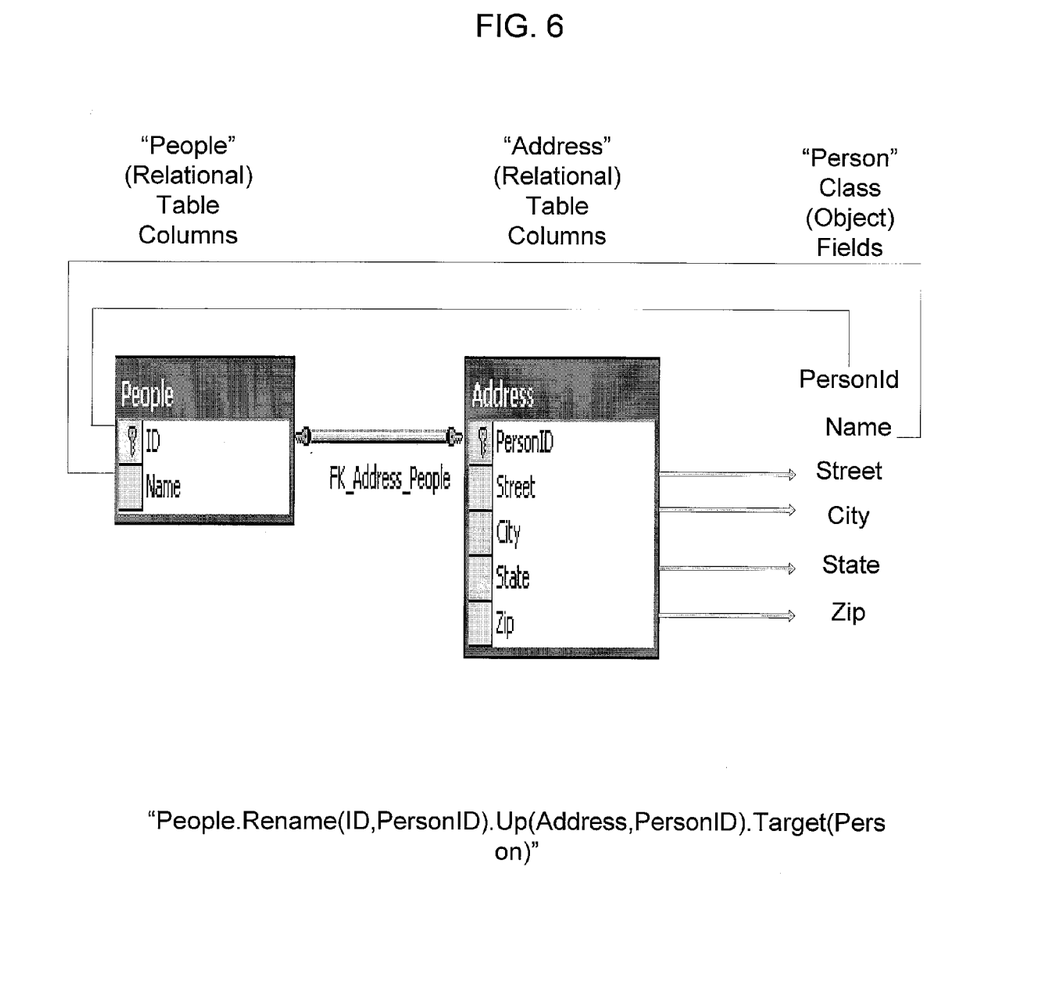
FIG. 6 illustrates another example in which data conforming to a relational data model is mapped to data conforming to an object data model using the declarative mapping system illustrated in FIG. 3, and shows how such mapping transformation is expressed in an exemplary mapping algebra that defines the mapping operation.

The mapping operation and its expression using an exemplary mapping algebra are illustrated in FIG. 6.

Advantageously, the operators of the mapping algebra illustrated in the preceding example define a type based, rather than a value based, language for performing mapping. As is known in the field of programming language development, "type" based languages are those that make extensive use of "types," i.e., defined categories of instances whose content is constrained by the defined category. The term "value," on the other hand, refers to the particular content of an instance of a given type.

Type-based approaches to programming language and application development have advantages over value-based approaches. Type-based approaches to programming environment development, for example, facilitate error detection at compile time. It is therefore an advantage that the mapping algebra of the preceding embodiment defines a mapping between types.

Properties of the Exemplary Mapping Algebra

In accordance with an embodiment of the present invention, the exemplary mapping algebra of the preceding example guarantees that mapping instructions, for example, in a mapping file, that are semantically defined by the algebra, will execute mapping operations that conform to certain mapping properties. Such properties may include bidirectional mapping qualities and compositional mapping qualities.

The precise definition of "bidirectional" and "compositional" requires that the mapping algebra be defined precisely, preferably using some well known axiomatic notational form.

For instance, in the exemplary algebra of the preceding example, an expression M simultaneously defines:

(1) a transformation from source type T to target type T.M;

(2) a read, or get, function $\lfloor M \rfloor$ from T to T.M that transforms a value of type T to a value of the mapped type T.M; and (3) an update, or put, function $\lceil M \rceil$ from T×T.M to T that takes a value of type T (the "original" value) and a value of the mapped type T.M (the "modified value) and reconstructs a "modified" value of the source type T.

Advantageously, the exemplary algebra has both bidirectional and compositional qualities. Mathematically, "bidirectional" means (amongst other possible properties) that:

Reading a value t from T to M.T and then writing the result back is the identity transformation: $\lceil m \rceil(\lfloor MJ \rfloor(t),t)=t$, and Writing a value t from M.T to T and then reading it back is the identity: $\lfloor M \rfloor(\lceil M \rceil(t,r))=t$.

"Compositional" mapping means that for any mapping expression M and N, the composition M.N is a bi-directional mapping expression and that the corresponding read and write function satisfy $\lfloor M \rfloor(\lfloor N \rfloor t)=\lfloor M.N \rfloor(t)$ and $\lceil M \rceil(\lceil N \rceil t,r)=\lceil M.N \rceil(t,r)$.

Exemplary Operating Environment

Figure 7:
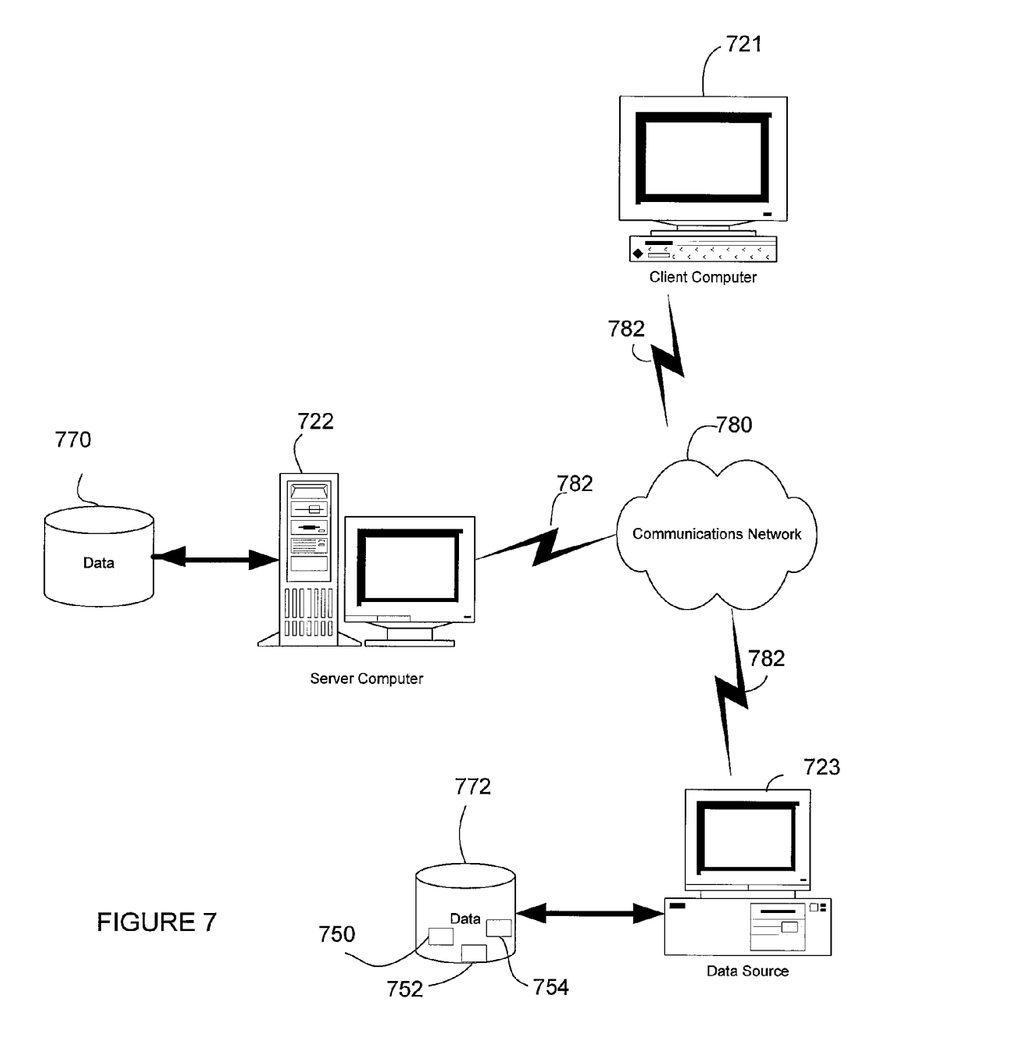
FIG. 7 is a block diagram illustrating an exemplary network environment in which embodiments of the present invention may be implemented.

Turning now to FIG. 7, it illustrates an exemplary network environment in which the invention may be implemented. The operating environment in FIG. 7 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, and other distributed computing environments that include any of the above systems or devices, and the like.

In the exemplary environment of FIG. 7, the network may include client computers 721, a server computer 722, data source computers 723, and databases 770, 772. The client computers 721 and the data source computers 723 are in electronic communication with the server computer 722 via communications network 780, e.g., an Internet. Client computers 721 and data source computers 723 are connected to the communications network by way of communications interfaces 782. Communications interfaces 782 can be any one of the well-known communications interfaces such as Ethernet connections, modem connections, and so on.

Server computer 722 provides management of database 770 by way of database server system software, which may conform, for example, to the relational data model. As such, server 722 acts as a storehouse of data and provides that data to a variety of data consumers.

In the example of FIG. 7, data sources are provided by data source computers 723. Data source computers 723 communicate data to server computer 722 via communications network 780, which may be a LAN, WAN, Intranet, Internet, or the like. Data source computers, such as data source computer 723 store data locally in databases which may be relational database servers. For example, relational database 772 shows data stored in tables 750, 752, and 754. In the example shown in FIG. 7, the data provided by the various data source computers is combined and stored in a large database such as database 770 maintained by server 722.

Client computers 721 that desire to use the data stored by server computer 722 can access the database 770 via communications network 780. Client computers 721 request the data by way of queries. In the embodiment disclosed in FIGS. 1 and 2, client computer queries may conform to the XML data model. The mapping component, that advantageously maps data conforming from one data model (e.g. XML) to data conforming to another data model (e.g. SQL) can be located on any of the client computers 721, server computers 722 or data source computers 723.

Figure 8:
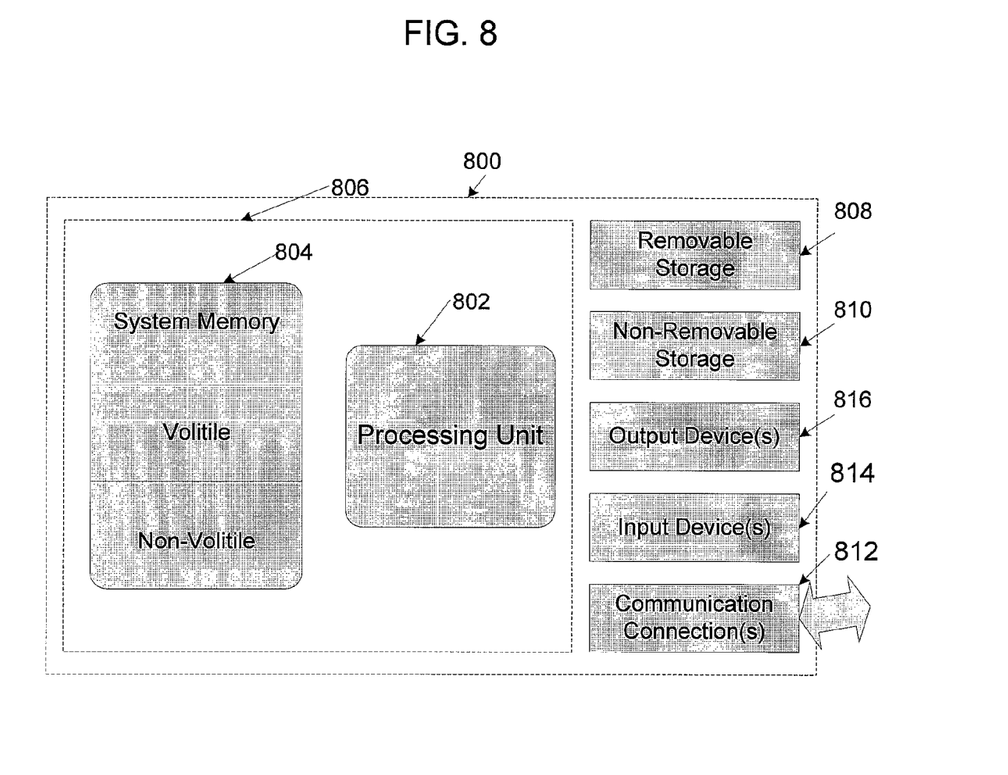
FIG. 8 is a block diagram illustrating the computing devices shown in FIG. 7 in greater detail.

Turning now to FIG. 8, an exemplary computing device 800 is shown to illustrate the client computers 721, server computers 722 or data source computers 723 of FIG. 7. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 8 by removable storage 808 and non-removable storage 810.

Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. In an embodiment of the present invention, executable instructions derived from program instructions defined by a mapping algebra may be stored on such computer storage media.

Device 800 may also contain communications connection(s) 812 that allow the device to communicate with other devices. Communications connection(s) 812 is an example of communication media. By way of example, and not limitation, communication media includes wired media such as a wired network or direct-wired connection, and wireless media such as acoustic, RF, infrared and other wireless media.

Device 800 may also have input device(s) 814 such as keyboard, mouse, pen, voice input device, touch input device, etc. Output device(s) 816 such as a display, speakers, printer, etc. may also be included. All these devices are well know in the art and need not be discussed at length here.

While the invention has been described and illustrated with reference to specific embodiments, those skilled in the art will recognize that modification and variations may be made without departing from the principles of the invention as described above and set forth in the following claims. Accordingly, reference should be made to the appended claims as indicating the scope of the invention.

What is claimed:

1. A computing device including a processing unit, the computing device also including:
   a software transformation element comprising instructions executed by the processing unit, the software transformation element causing transformation of data conforming to a first data model into data conforming to a second data model,
   wherein the instructions in said software transformation element are obtained from a set of programming language instructions that are semantically defined by mapping algebra for executing a bi-directional and compositional mapping between the first and the second data models, wherein the bi-directional mapping comprises:
   a read operation that transforms a value of a source type to a value of a mapped target type, in accordance with a floor function of an algebraic expression; and
   an update operation that takes the value of the source type and the value of the mapped target type and reconstructs therefrom, a modified value of the source type, in accordance with a ceiling function of the algebraic expression; and
   the compositional mapping comprises at least one of an associative read operation using a pair of algebraic expressions, or an associative write operation using the pair of algebraic expressions.

2. The computing device of claim 1 wherein the instructions in said software transformation element also comprise instructions mapping particular metadata characteristics of the data conforming to the first data model to metadata characteristics of the other data conforming to the second data model.

3. The computing device of claim 2 where the metadata characteristics of the data conforming to the first data model comprise first structural characteristics of the first data model, the metadata characteristics of the other data conforming to the second data model comprise second structural characteristics of the second data model, and the instructions in said software transformation element comprise instructions mapping the first structural characteristics of the data conforming to the first data model to the second structural characteristics of the other data conforming to the second data model.

4. The computing device of claim 2 where the metadata characteristics of the data conforming to the first data model comprise first field characteristics of the first data model, the metadata characteristics of the other data conforming to the second data model comprise second field characteristics of the second data model, and the instructions in said software transformation element comprise instructions mapping the first field characteristics of the data conforming to the first data model to the second field characteristics of the other data conforming to the second data model.

5. The computing device of claim 2 where the metadata characteristics of the data conforming to the first data model comprise first relationship characteristics of the first data model, the metadata characteristics of the other data conforming to the second data model comprise second relationship characteristics of the second data model, and the instructions in said software transformation element comprise instructions mapping the first relationship characteristics of the data conforming to the first data model to the second relationship characteristics of the other data conforming to the second data model.

6. The computing device of claim 1 where the first data model is a relational database data model.

7. The computing device of claim 6 where the second data model is an xml data model.

8. The computing device of claim 6 where the second data model is an object data model.

9. The computing device of claim 1 where the first data model is an xml data model.

10. The computing device of claim 9 where the second data model is a relational database data model.

11. The computing de\ice of claim 1 where the first data model is an object data model.

12. The computing device of claim 11 where the second data model is a relational database data model.

13. The computing device of claim 1 wherein the bi-directional read function incorporates a first expression M in a first identity transformation $\lceil M \rceil(\lfloor M \rfloor(t),t)=t$ whereby a value of a source type T is transformed to a value of a mapped target type T.M.

14. The computing device of claim 13 wherein the bi-directional update function incorporates the first expression M in a second identity transformation $\lfloor M \rfloor(\lceil M \rceil(t),t)=t$ whereby the value of the source type T and the value of the mapped target type T.M are used to reconstruct a modified value of the source type T.

15. The computing device of claim 14 wherein the compositional read function incorporates the first expression M wad the second expression N for satisfying a third identity transformation $\lfloor M \rfloor(\lfloor N \rfloor t)=\lfloor M.N \rfloor(t)$.

16. The computing device of claim 15 wherein the compositional read function incorporates the first expression M and the second expression N for satisfying a fourth identity transformation $\lceil M \rceil(\lceil M \rceil t,r)=\lceil M.N \rceil(t,r)$.

17. A method for transforming data in a computer, the method comprising the steps of:
   generating a first request in a software application of the computer; and transforming the first request conforming to structure, field and relationship data within a first data model into a second request conforming to structure, field and relationship data within a second data model using a set of programming language instructions that are semantically defined by mapping algebra operators;
   said mapping algebra operators are selected for executing a bidirectional and compositional mapping between a target and a source, wherein:
      said bidirectional and compositional mapping is materialized using a type-based query language of the second data model and translated thereon into a type-based query language of the first data model for carrying out at least one of a) reading a data value from the source to the target, transforming the read data value using said mapping algebra operators, and then writing the transformed result back to the source, or b) writing a data value from the target to the source, transforming the written data value using said mapping algebra operators, and then reading the transformed value back to the target;
   the bi-directional mapping comprises:
      a read operation that transforms a value of a source type to a value of a mapped target type, in accordance with a floor function of an algebraic expression: and
      an update operation that takes the value of the source type and the value of the mapped target type and reconstructs therefore, a modified value of the source type, in accordance with a ceiling function of the algebraic expression: and the compositional mapping comprises at least one of an associative read operation using a pair of algebraic expressions, or an associative write operation using the pair of algebraic expressions.

18. The method of claim 17 wherein the step of transforming the first request conforming to the first data model comprises mapping particular metadata characteristics of data conforming to the first data model to metadata characteristics of data conforming to the second data model.

19. The method of claim 18 where the metadata characteristics of the data conforming to the first data model comprise first structural characteristics of the first data model, the metadata characteristics of the data conforming to the second model comprise second structural characteristics of the second data model, and the mapping step further comprises mapping the first structural characteristics of the data conforming to the first data model to the second structural characteristics of the data conforming to the second data model.

20. The method of claim 18 where the metadata characteristics of the data conforming to the first data model comprise first field characteristics of the first data model, the metadata characteristics of the data conforming to the second model comprise second field characteristics of the second data model, and the mapping step further comprises mapping the first held characteristics of the data conforming to the first data model to file second field characteristics of the data conforming to the second data model.

21. The method of claim 18 where the metadata characteristics of the data conforming to the first data model comprise first relationship characteristics of the first data model, the metadata characteristics of the data conforming to the second model comprise second relationship characteristics of the second data model, and the mapping step further comprises mapping the first relationship characteristics of the data conforming to the first data model to the second relationship characteristics of the data conforming to the second data model.

22. The method of claim 17 where the first data model is a relational database data model.

23. The method of claim 22 where the second data model is an xml data model.

24. The method of claim 22 where the second data model is an object data model.

25. The method of claim 17 where the first data model is an xml data model.

26. The method of claim 25 where the second data model is a relational database data model.

27. The method of claim 17 where the first data model is an object data model.

28. The method of claim 27 where the second data model is a relational database data model.

29. The method of claim 17 wherein said mapping algebra comprises a set of mapping expressions that define mapping operations performed on data types.

30. A computer-readable medium having computer-executable instructions for performing steps comprising:
    transforming structure, field and relationship data conforming to a first data model into structure, field and relationship data conforming to a second data model, by using a set of programming language instructions that are semantically defined by mapping algebra operators, wherein the mapping algebra operators are executed for providing a bi-directional and compositional mapping between the first and the second data models, the mapping materialized using a type-based query language of the second data model and translated thereon into a type-based query language of the first data model for carrying out at least one of a) reading a data value from a source to a target, transforming the read data value using said mapping algebra operators, and then writing the transformed result back to the source, or b) writing a data value from the target to the source, transforming the written data value using said mapping algebra operators, and then reading the transformed value back to the target, wherein:

the bi-directional mapping comprises:

a reading operation that transforms a value of a source type to a value of a mapped target type, in accordance with a floor function of an algebraic expression; and an update operation that takes the value of the source type and the value of the mapped target type and reconstructs therefrom, a modified value of the source type, in accordance with a ceiling function of the algebraic expression; and the compositional mapping comprises at least one of an associative read operation using a pair of algebraic expressions, or an associative write operation using the pair of algebraic expressions.

31. The computer-readable medium of claim 30 where the step of bidirectional and compositional mapping comprises mapping particular metadata characteristics of data conforming to the first data model to metadata characteristics of the other data conforming to the second data model.

32. The computer-readable medium of claim 31 where the metadata characteristics of the data conforming to the first data model comprise first structural characteristics of the first data model, the metadata characteristics of the other data conforming to the second model comprise second structural characteristics of the second data model, and the mapping step further comprises mapping the first structural characteristics of the data conforming to the first data model to the second structural characteristics of the other data conforming to the second data model.

33. The computer-readable medium of claim 31 where the metadata characteristics of the data conforming to the first data model comprise first field characteristics of file first data model, the metadata characteristics o % the other data conforming to the second model comprise second field characteristics of the second data model, and the mapping step further comprises mapping the first field characteristics of the data conforming to the first data model to the second field characteristics of the other data conforming to the second data model.

34. The computer-readable medium of claim 31 where the metadata characteristics of the data conforming to the first data model comprise first relationship characteristics of the first data model, the metadata characteristics of the other data conforming to the second model comprise second relationship characteristics of the second data model, and the mapping step further comprises mapping the first relationship characteristics of the data conforming to the first data model to the second relationship characteristics of the other data conforming to the second data model.

35. The computer-readable medium of claim 30 where the first data model is a relational database data model.

36. The computer-readable medium of claim 35 where the second data model is an xml data model.

37. The computer-readable medium of claim 35 where the second data model is an object data model.

38. The computer-readable medium of claim 35 where the first data model is an xml data model.

39. The computer-readable medium of claim 38 where the second data model is a relational database data model.

40. The computer-readable medium of claim 30 where the first data model is an object data model.

41. The computer-readable medium of claim 40 where the second data model is a relational database data model.

42. The computer-readable medium of claim 30 wherein said mapping algebra comprises a set of mapping expressions that define mapping operations performed on data types.

* * * * *